United States Patent [19]
Wodrich et al.

[11] Patent Number: 5,727,638
[45] Date of Patent: Mar. 17, 1998

[54] DOWN PRESSURE SYSTEM WITH FREE FLOAT EXTENSION

[75] Inventors: Timothy Dirk Wodrich, Rock Island; Ralph Everette Stanfill, Geneseo, both of Ill.

[73] Assignee: Deere & Company, Moline, Ill.

[21] Appl. No.: 691,105

[22] Filed: Aug. 1, 1996

[51] Int. Cl.[6] .................................................. A01C 5/06
[52] U.S. Cl. ...................... 172/414; 172/500; 172/501; 111/151; 111/163
[58] Field of Search .................................. 172/414, 264, 172/261, 260.5, 705, 407, 408, 497, 500, 501, 551, 570, 572, 668, 395, 776, 538; 111/151, 926, 149, 157, 163, 167, 168, 170, 190, 191, 194, 195, 121, 69, 52, 107, 109

[56] References Cited

U.S. PATENT DOCUMENTS

| | | |
|---|---|---|
| 4,098,348 | 7/1978 | McChesney ............... 172/414 X |
| 4,116,140 | 9/1978 | Anderson et al. ........... 172/501 X |
| 4,700,785 | 10/1987 | Bartusek et al. ........... 172/705 |
| 4,760,806 | 8/1988 | Bigbee et al. . |
| 5,065,681 | 11/1991 | Hadley . |
| 5,092,255 | 3/1992 | Long et al. . |
| 5,163,518 | 11/1992 | Foley ..................... 172/500 X |
| 5,277,257 | 1/1994 | Thompson et al. ........... 172/414 X |

*Primary Examiner*—John A. Ricci
*Assistant Examiner*—Christopher J. Novosad

[57] ABSTRACT

An opener for use in varying ground conditions, ranging from no-till to conventional full tillage conditions, includes an adjustable down pressure control and a down pressure spring and tension link assembly which selectively provide a limited free float opener condition or a conventional down pressure spring controlled bias condition. A sleeve slidably received by the opener arm and mounted over the lower portion of the tension link assembly allows the opener to free float in loose soil conditions so that only the weight of the opener provides downward bias when the down pressure control is adjusted to a minimum condition. The opener is free to ride up and down to follow irregularities in the ground surface. In harder soil conditions such as those encountered in no-till farming methods, the down pressure control is adjusted to a position wherein an enlarged portion on the sleeve bottoms against the opener arm and the spring begins to compress so that the opener operates in the conventional spring biased mode. The sleeve allows increased downward movement of the opener to follow depressions in the soil.

20 Claims, 3 Drawing Sheets

DOWN PRESSURE SYSTEM WITH FREE FLOAT EXTENSION

BACKGROUND OF INVENTION

1) Field of Invention

The present invention relates generally to agricultural implements such as conservation openers, and more specifically to down pressure systems for such implements.

2) Related Art

In recent years, no-till farming methods have been employed, and planting in soil conditions where the ground has not been worked requires openers having down pressure systems that can generate a relatively high down force for adequate ground penetration. An example of such an opener is shown in U.S. Pat. No. 4,760,806. This type of opener, commercially available on the John Deere 750 Grain Drill, has a down pressure spring that starts to compress when a minimum force of approximately 225 pounds is applied to the opener. A hydraulic control such as shown in U.S. Pat. No. 5,065,681 is connected to an opener rockshaft and provides an adjustable average down force on the openers. The control can be adjusted so that the openers just come into contact with the ground without compression of the down pressure springs.

For various reasons, operators that have switched to no-till farming methods will at times be required to work the seed bed prior to seeding. In loosened soil conditions the relatively high minimum force causes the opener to penetrate the soil too deeply. To alleviate the over-penetration problem in tilled soil, the operator often reduces the hydraulically adjustable down force applied to the opener rockshaft to the level at which the openers just contact the ground and the down pressure springs do not yet compress. As the drill passes over surface irregularities and undulations, each opener is able to rise by compressing the spring but is unable to lower because of the limitations of the down force system. When the drill passes over a depression which is within the width of the drill, one or more of the openers are often unable to drop down a sufficient distance to follow the depression and place the seed at the proper planting depth unless the down force on the other openers is increased to a level above the optimum. At times, the seed may actually be placed on the surface of the soil rather than in the ground. Also, an opener which is following a wheel in tilled soil may be unable to lower a sufficient amount to run in the wheel track depression, especially when the down force is set to the minimum level.

BRIEF SUMMARY OF THE INVENTION

It is therefore an object of the present invention to provide an improved down pressure system for use in implements such as conservation openers. It is another object to provide such a system which overcomes most or all of the above-listed disadvantages of previously available down pressure system.

It is a further object to provide an improved down pressure system for a ground working implement which alleviates depth control problems associated with ground working tools having to work in soils that range from previously worked loose soil conditions to relatively hard no-till soil conditions. It is still another object to provide such a system which allows the tools to follow ground irregularities and undulations and to run in wheel tracks in the different soil conditions without over- or under-penetration of the tools in the soil.

It is another object of the present invention to provide an opener down pressure structure including an adjustable hydraulic down pressure control and down pressure spring, wherein the control can be set to operate the opener in first and second down pressure ranges, the down pressure in the first range being substantially less than the second for operating in loose soil conditions without over-penetration or under-penetration, even when the implement passes over depressions in the soil or the opener is riding in a wheel track. It is a further object to provide such structure wherein in the first range the down pressure is dependent substantially on opener weight alone and in the second range the opener is biased downwardly by the down pressure spring and the opener weight.

It is another object to provide an improved down pressure spring arrangement for an earthworking tool mounted on a pivoting opener arm. It is a further object to provide such an arrangement in combination with a hydraulic down pressure control to provide a first down pressure range particularly suitable for tilled soil conditions and a second down pressure range for harder minimum and no-till conditions.

It is a further object to provide an agricultural down pressure spring arrangement having a lost motion connection between the down pressure spring and the tool supporting arm to provide different ranges of down pressure operation for different soil conditions. It is a further object to provide such an arrangement which facilitates proper depth of operation with under low down pressure conditions, even when the tool is operating in a tire track.

A grain drill opener assembly or similar spring biased ground working implement for use in varying ground conditions, ranging from no-till to conventional full tillage conditions, includes an adjustable down pressure control and a down pressure spring and tension link assembly which selectively provide either a limited free float opener condition or a conventional down pressure spring controlled bias condition. A sleeve slidably received by the opener arm and mounted over the lower portion of the tension link assembly allows the opener to free float in loose soil conditions so that only the weight of the opener provides downward bias when the down pressure control is adjusted to a minimum condition. The opener is free to ride up and down to follow irregularities in the ground surface and to operate at the proper depth in a wheel track or similar depression in the soil without having to increase the average down pressure on the openers. In harder soil conditions such as those encountered in no-till farming methods, the down pressure control is adjusted to a position wherein the sleeve bottoms against the opener arm and the spring begins to compress so that the opener operates in the conventional spring biased mode.

These and other objects, features and advantages of the present invention will become apparent to one skilled in the art upon reading the following detailed description in view of the drawings.

DESCRIPTION OF THE PRIOR ART

Figure 1:
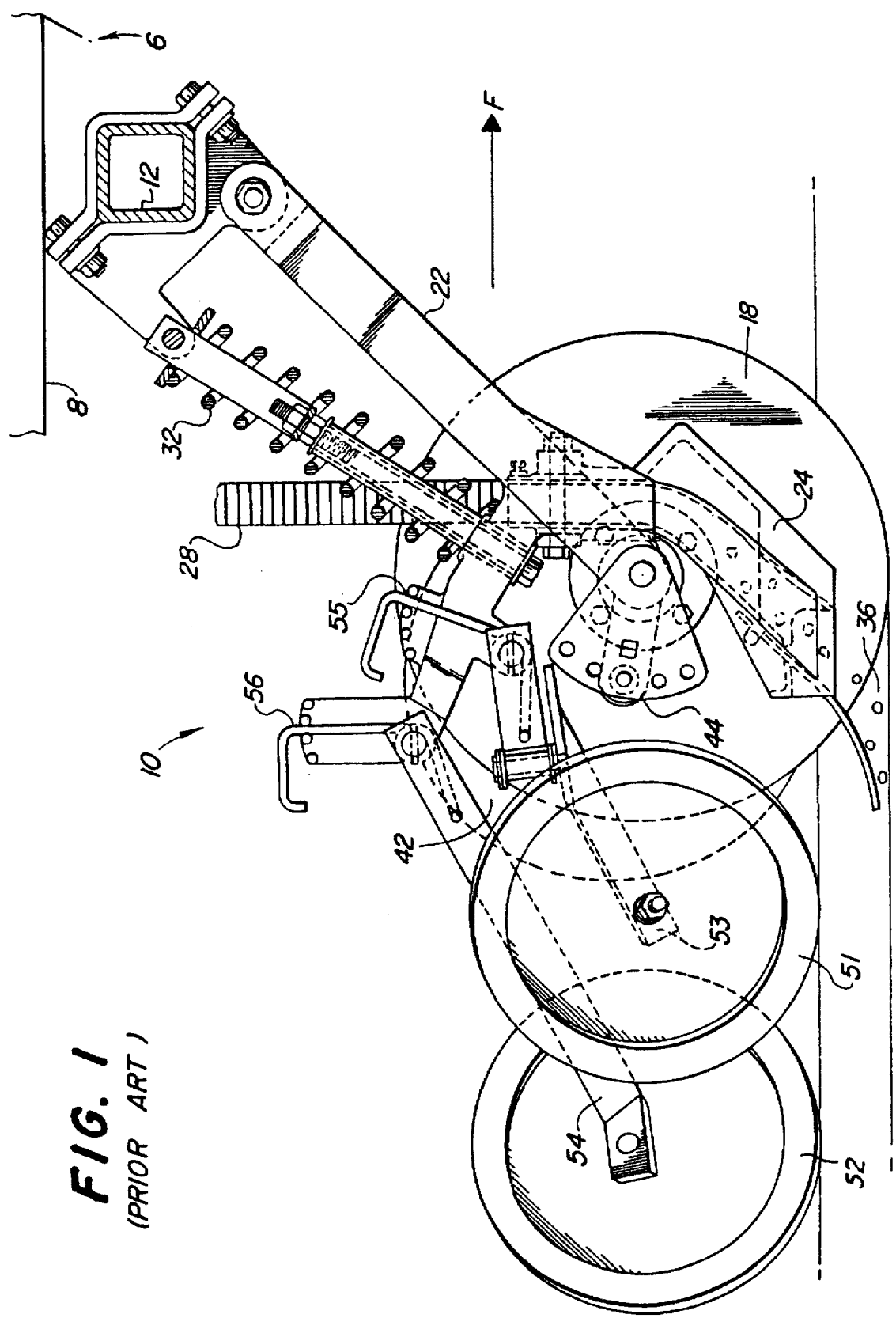
FIG. 1 is a side view of a conventional grain drill opener assembly with a hydraulic down pressure control and a down pressure spring.

Referring to FIG. 1, therein is shown a portion of an implement 6 with a main frame 8 adapted to be towed forwardly (F) over the surface of the ground by a tractor (not shown). As shown, the implement 6 is a grain drill and includes a plurality of conventional furrow opener assemblies 10 supported from a rockshaft 12 mounted on the frame 8. Each furrow opener assembly 10 is generally of the type shown and described in the aforementioned U.S. Pat. No. 4,760,806 and U.S. Pat. No. 5,092,255 and includes an angled disk 18 supported from a drawbar 22 for rotation about an axis angled from the transverse direction. A seed boot 24 is supported adjacent the disk 18 and is connected to a metered source of seeds on the implement through a flexible seed tube 28. A down pressure spring assembly 32 connected to an adjustable hydraulic down pressure control 34 adjustably biases the opener disk 18 into the soil to open a furrow 36. In addition to opener lift and lower functions, the control 34 provides a generally constant average down pressure for the opener assemblies on the rockshaft 12 and preferably is of the type shown and described in the aforementioned U.S. Pat. No. 5,065,681.

A depth adjustment wheel 42 is supported for rotation adjacent the leading side of the disk 18 about an axis offset from the axis of the disk. Furrow depth control is provided by an adjustment mechanism 44 which moves the axis of the wheel 42 vertically with respect to the disk. Firming and closing wheels 51 and 52 are supported rearwardly adjacent the disk 18 from arms 53 and 54 and may be adjusted by down pressure spring assemblies 55 and 56.

DESCRIPTION OF THE PREFERRED EMBODIMENT

Figure 3:
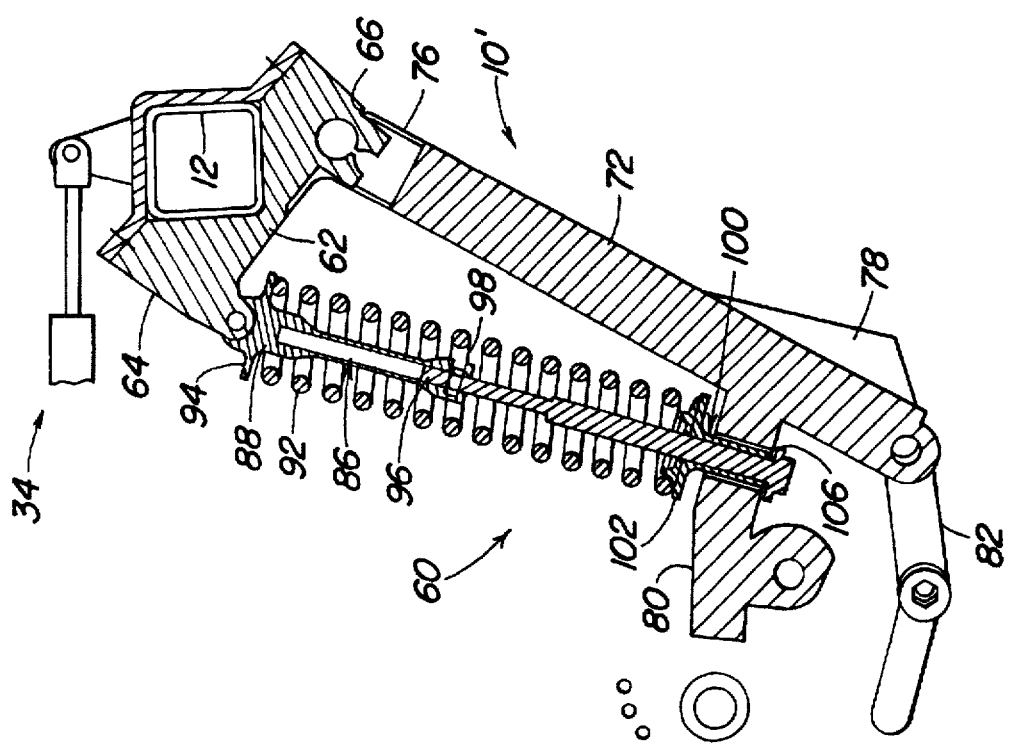
FIG. 3 is a side view similar to FIG. 2 but showing the spring arrangement partially in section.
Figure 2:
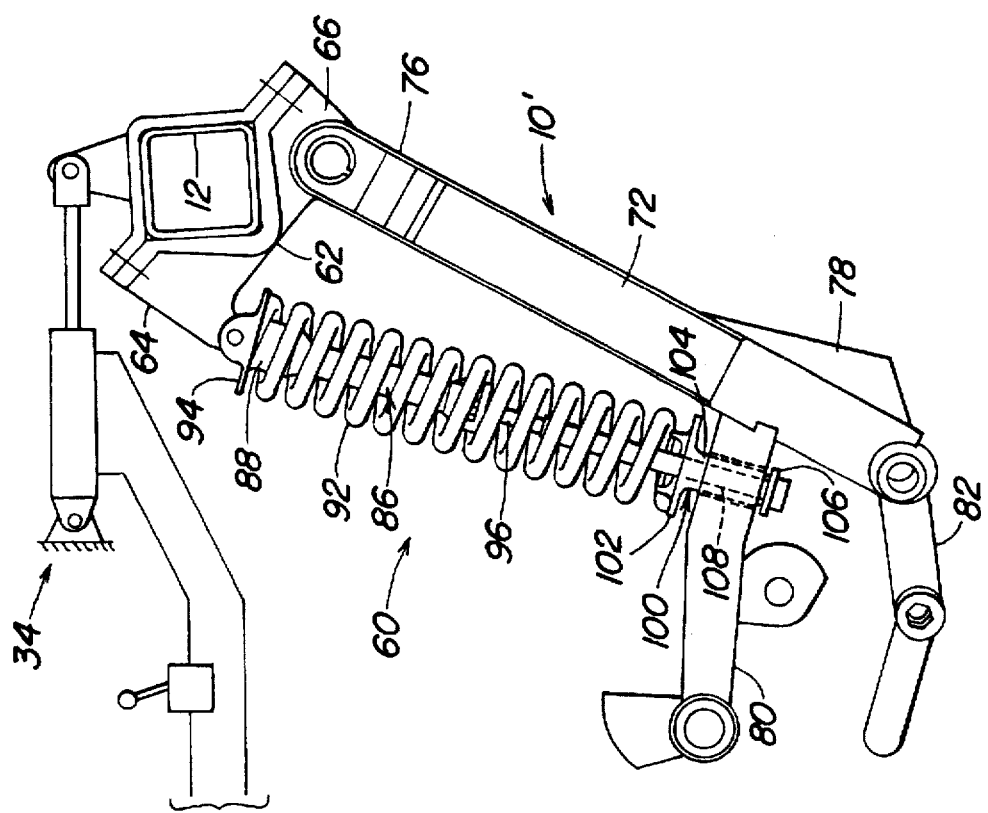
FIG. 2 is a side view of an improved down pressure spring arrangement for an opener showing the opener within a first range positions for a relatively low downward bias.
Figure 4:
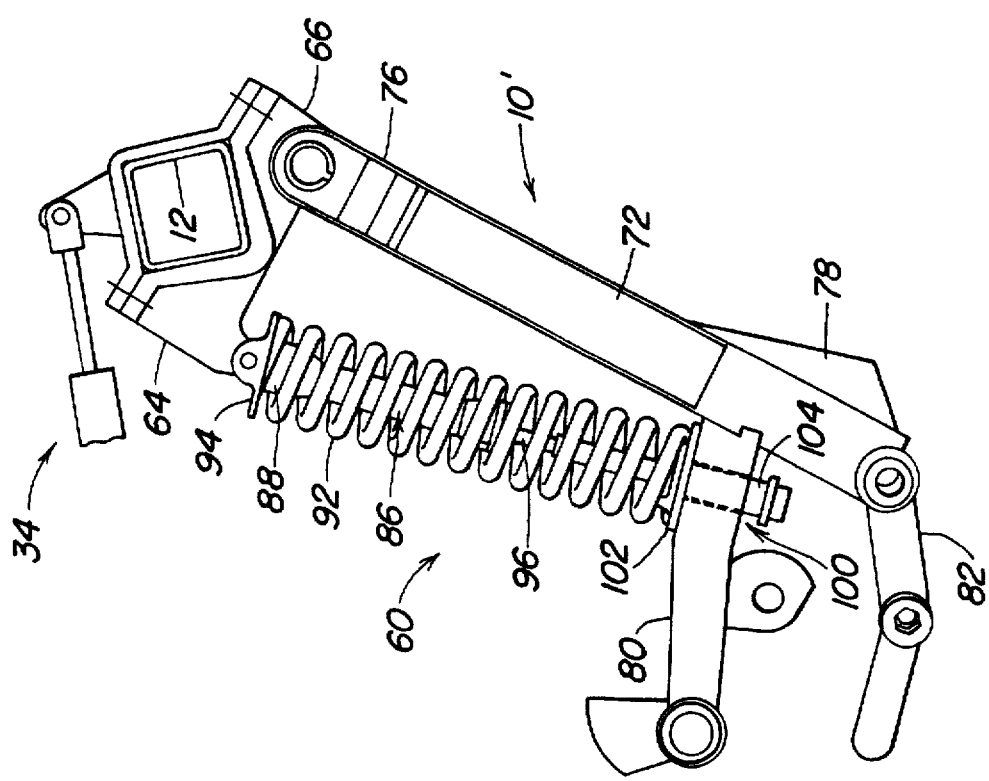
FIG. 4 is a view similar to FIG. 2 but showing the opener at the lower end of a second range of positions wherein the down pressure spring is begins to provide downward bias on the opener assembly.

Referring to FIGS. 2-4, therein is shown a furrow opener assembly 10' having an improved down pressure spring arrangement 60 that provides two-stage down pressure or force capability for improved operation in varying soil conditions. In the first stage, downward bias is independent of a down pressure spring and in the second stage a conventional spring-assisted, adjustable down pressure is provided.

The opener assembly 10' includes a bracket 62 attached to the rockshaft 12 and having upper and lower rearwardly directed support portions 64 and 66. The rockshaft 12 with the bracket 62 is rockable about a transverse pivot by the hydraulic down pressure control 34. A drawbar or arm 72 includes an upper rear portion 76 pivotally connected to the support portion 66. The arm 72 extends downwardly and rearwardly to a lower tool supporting end 78 for supporting conventional earth engaging tools such as shown in the furrow opener assembly 10 of FIG. 1. The tool supporting end 78 includes an arm portion 80 projecting rearwardly from the arm 72 and a lower support 82 extending rearwardly from the bottom of the arm 72. The aft end of the arm portion 80 supports firming and closing wheels (not shown) similar to those shown at 51 and 52 in FIG. 1. An angled disk, depth control wheel, and depth adjustment mechanism (not shown) similar to those shown at 18, 42 and 44 in FIG. 1 are supported at the bottom of the arm 72 and on the lower support 82.

The down pressure spring arrangement 60 includes a tension link indicated generally at 86 having an upright casting 88 pivotally connected at its upper end to the bracket support portion 64. A coil spring 92 encircles the casting 88 and abuts an upper spring retaining member 94. The casting 88 includes an axially extending bore and a lowermost nut capturing portion (FIG. 3) non-rotatably receiving a nut 98. The threaded end of the bolt 96 is received by the nut 98 in the capturing portion and extends upwardly into the casting bore.

A sleeve member 100 including an enlarged spring abutting end 102 and a cylindrical sleeve 104 is slidably supported on the lower headed end of the bolt 96 directly above an enlarged washer 106. The sleeve 104 is slidably received within a bore 108 located in a receiving area of the arm portion 80. The length of the sleeve 104 is substantially greater than the thickness of the arm portion so that the sleeve member 100 can slide freely in a vertical direction relative to the arm between a lowermost position (FIG. 4) wherein the spring abutting end 102 bottoms on the top of the arm portion 80 and an uppermost position (not shown) wherein the washer 106 contacts the bottom of the arm portion 80.

The end 102 projects into the lower end of the spring 92 and retains the end on the sleeve. The bolt 96 is threaded into the nut 98 to provide a preselected spring compression. The arm 72 can pivot freely independently of any bias from the spring 92 until the arm reaches a pivotal position where the lower side of the enlarged end 102 contacts the top of the arm portion 80 (FIG. 4). Thereafter, any further rotation of the arm 72 upwardly causes the spring 92 to compress beyond the preselected spring compression between the end 102 and the upper retaining member 94. The lower end of the bolt 96 will slide downwardly through the sleeve 104 as the spring 92 is compressed with upward rotation of the arm 72 about the pivotal axis at 66. When the rockshaft 12 is rotated in the clockwise direction to raise the opener assembly 10' from the ground, the enlarged washer 106 contacts the bottom of the arm portion 80, and the tension link 86 rotates the arm 72 upwardly to a transport position wherein any tools connected to the arm are offset a substantial distance above the ground.

In operation, assuming that the operator is about to begin a planting operation in a field that has loose soil conditions, the rockshaft 12 is rotated in the counterclockwise direction by adjusting the down pressure control to a minimum level to extend the cylinder until the opener assembly 10' just engages the ground and the sleeve assembly 100 passes through the position shown in FIGS. 2 and 3 to rest on the arm portion 80. At the minimum down pressure setting of the control 34, the downward bias on the assembly is substantially limited to that provided by the weight of the assembly. The arm 72 is free to pivot up and down to follow the ground contour independently of any bias by the down pressure spring 92 until the arm portion either bottoms on the washer 106 or contacts the enlarged end 102 of the sleeve assembly 100 and begins to compress the spring. If for any reason an individual opener assembly 10' encounters an obstacle, the arm 72 can pivot upwardly beyond the non-biased free pivoting range as the end 102 which contacts the arm portion 80 compresses the spring 92. However, the pressure control 34 will automatically maintain the rockshaft 12 in the position wherein the average operating pressure of the opener assemblies is such that free pivoting of at least most of the assemblies on the rockshaft is maintained. If the opener has to operate in a tire track or has to move down in a depression in the soil, the sleeve assembly 100 helps assure that the opener does not lift out of the soil.

If the operator encounters harder soil conditions, for example, those conditions typical of minimum or no-till practices, he adjusts the pressure control 34 to rotate the rockshaft 12 in the counterclockwise direction from the free pivot position to a position wherein the enlarged end 102 bottoms on the arm portion 80 and the spring 92 begins to compress. Thereafter, the opener assembly 10' operates in the conventional spring biased mode wherein the down pressure on the opener assembly is the sum of the opener weight and the bias provided by the spring 92. An average down pressure is maintained by the control 34. Preferably, the minimum vertical bias provided in the conventional spring biased mode is at least 30% greater than the bias provided when the arm is in the free float condition.

Having described the preferred embodiment, it will be apparent that modifications can be made without departing from the scope of the invention as set forth in the accompanying claims.

We claim:

1. In an implement having a frame adapted for forward movement over the ground, an opener assembly having an opener arm rockably connected to the frame for vertical movement with respect to the frame and a rearward end connected to a furrow opener for providing a furrow in the ground, a down pressure system for adjustably biasing the opener arm, the down pressure system comprising:

a coil spring having first and second abutment portions;

a tension link extending through the coil spring and having first and second ends;

a pressure adjusting mechanism connected between the frame and the coil spring; and a lost motion connection extending between the second end of the tension link and the opener arm, the lost motion connection providing a limited downward bias on the furrow opener independent of the coil spring over a first range of vertical movement of the furrow opener arm and a spring-dependent downward bias on the opener over a second range of vertical movement of the opener arm.

2. The down pressure system as set forth in claim 1 wherein the lost motion connection comprises a member slidably received by the opener arm.

3. The down pressure system as set forth in claim 2 wherein the member is connected to the second end of the tension link and includes an enlarged section positioned adjacent the second abutment portion.

4. The down pressure system as set forth in claim 2 wherein the member comprises a first portion of preselected cross-section projecting through the opener arm and a second portion of cross-section larger than that of the first portion and abutting the second abutment portion of the spring.

5. The down pressure system as set forth in claim 4 wherein the first portion slides freely through the opener arm in the first range of vertical movement, the first range of vertical movement defining a limit position wherein the opener arm contacts the second portion.

6. The down pressure system as set forth in claim 2 wherein the tension link comprises an adjustable length member including a bolt projecting downwardly through the opener arm and having a lower enlarged head portion limiting downward rocking of the opener arm to a lowermost position, wherein the lowermost position is dependent upon length of the adjustable length member.

7. The down pressure system as set forth in claim 2 wherein the tension link compresses the coil spring and defines an initial spring compression, and the downward bias in a preselected limit position in the second range is dependent on the initial spring compression.

8. The down pressure system as set forth in claim 7 wherein the tension link includes an adjustable length member for varying the initial spring compression.

9. The down pressure system as set forth in claim 1 wherein the opener has a preselected weight and, when the opener arm is in the first range of vertical movement, substantially all of the downward bias is dependent upon the preselected weight.

10. The down pressure system as set forth in claim 9 wherein the downward bias in the second range is dependent upon the preselected weight and the compression of the spring and is at least 30% greater than the downward bias in the first range.

11. In an agricultural implement having a frame adapted for forward movement over the ground, the implement including an opener tool assembly with an arm having a first end pivotally connected to the frame for rocking of the arm about a transverse horizontal axis and a second end supporting an earthworking tool, down pressure structure for biasing the tool into the ground with varying down pressure, the down pressure structure comprising:

a tension link;

a receiving portion connected to the arm and supporting the tension link;

a movable down pressure control connected to the tension link;

a compression spring supported by the tension link between the receiving portion and the down pressure control;

the down pressure control movable relative to the arm over a first range of positions relative to the arm wherein the compression spring is offset from the receiving portion so the arm is free to pivot about the axis independently of the compression spring and over a second range of positions wherein the compression spring abuts the receiving portion and biases the arm about the axis, the bias of the spring dependent upon the position of the down pressure control in the second range.

12. The down pressure structure as set forth in claim 11 wherein the tension link is slidably received by the receiving portion and the compression spring has a precompressed length less than the length of the tension link.

13. The down pressure structure as set forth in claim 12 wherein, in the first range of positions, the arm is in a free float condition wherein down pressure on the tool is provided substantially by weight of the opener tool assembly.

14. The down pressure structure as set forth in claim 13 wherein the down pressure control, when in the second range of positions relative to the arm, provides a minimum vertical bias which differs by at least 30% from a bias provided when the arm is in the free float condition.

15. In an agricultural implement with a frame and including a conservation opener having an earthworking tool supported from an aft end of an arm, the arm having a forward end connected for pivoting relative to the frame, a two-stage down pressure arrangement for providing a first stage of down pressure on the opener for operation in first ground conditions and a second stage of down pressure lower than the first stage of down pressure for operation of the opener in ground conditions wherein the ground is looser than in the first ground conditions, the down pressure arrangement comprising:

a spring assembly including a coil spring supported between the frame and the arm;

a down pressure control connected to the spring assembly and movable relative to the arm to selectively move the spring assembly between biasing and non-biasing positions relative to the arm, wherein when the spring assembly is in the non-biasing position, the arm is free to pivot independently of the spring and when the spring is in the biasing position, the spring is compressed between the arm and the frame to bias the arm vertically.

16. The down pressure arrangements as set forth in claim 15 wherein the spring assembly includes a tension link connected to the down pressure control and supporting the coil spring at a preselected spring length when the spring assembly is in the non-biasing position, the tension link including a lost motion connection portion facilitating motion of the arm relative to the frame when the spring assembly is in the non-biasing position.

17. The down pressure arrangements as set forth in claim 16 wherein the lost motion connection portion includes a spring abutment member slidably received by the arm, the spring abutment member contacting the arm when the spring assembly is moved to the biasing position.

18. The down pressure arrangements as set forth in claim 16 wherein the lost motion connection portions facilitates downward movement of the conservation opener when the spring assembly is in the non-biasing position so the opener can follow depressions and wheel tracks in the soil.

19. The invention as set forth in claim 16 wherein the lost motion connection portion includes a sleeve slidably positioned in an aperture in the arm, and wherein the tension link further includes a bolt slidably received through the sleeve and projecting into the coil spring.

20. The invention as set forth in claim 15 wherein the spring assembly includes a tension member extending through the coil spring and retaining the coil spring in a preselected compressed condition when the spring assembly is in the non-biasing position and a downwardly projecting portion slidably received by the arm.

* * * * *